(12) United States Patent
Nagata et al.

(10) Patent No.: US 10,991,251 B2
(45) Date of Patent: Apr. 27, 2021

(54) PARKING METER MONITORING AND PAYMENT SYSTEM

(71) Applicant: Toyota Motor Engineering & Manufacturing North America, Inc., Plano, TX (US)

(72) Inventors: Katsumi Nagata, Foster City, CA (US); Divya Sai Toopran, Sunnyvale, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 194 days.

(21) Appl. No.: 16/261,349

(22) Filed: Jan. 29, 2019

(65) Prior Publication Data

US 2020/0242935 A1     Jul. 30, 2020

(51) Int. Cl.
| | | |
|---|---|---|
| *G08G 1/14* | (2006.01) | |
| *G05D 1/02* | (2020.01) | |
| *G06Q 20/10* | (2012.01) | |
| *G07B 15/02* | (2011.01) | |
| *G08B 21/18* | (2006.01) | |
| *H04W 4/024* | (2018.01) | |

(52) U.S. Cl.
CPC ........... *G08G 1/144* (2013.01); *G05D 1/0212* (2013.01); *G05D 1/0276* (2013.01); *G06Q 20/10* (2013.01); *G07B 15/02* (2013.01); *G08B 21/182* (2013.01); *H04W 4/024* (2018.02); *G05D 2201/0213* (2013.01)

(58) Field of Classification Search
CPC .. G07C 1/30; G07C 2209/63; G07C 9/00309; G08G 1/144; G05D 1/0276; G05D 1/0212; G05D 2201/0213; G07B 15/02
See application file for complete search history.

(56) References Cited

U.S. PATENT DOCUMENTS

| | | | |
|---|---|---|---|
| 7,104,447 B1 * | 9/2006 | Lopez | G06Q 20/206 235/381 |
| 7,177,623 B2 * | 2/2007 | Baldwin | H04W 4/90 455/404.2 |
| 8,751,271 B2 | 6/2014 | Stefik et al. | |
| 9,330,303 B2 | 5/2016 | Nerayoff et al. | |

(Continued)

FOREIGN PATENT DOCUMENTS

EP          3223248          9/2017

*Primary Examiner* — Mussa A Shaawat
(74) *Attorney, Agent, or Firm* — Snell & Wilmer LLP (57) ABSTRACT

Methods and systems for automatically monitoring a parking meter associated with a vehicle. The system includes a transceiver configured to receive location data of a mobile device associated with a user of the vehicle. The system includes an electronic control unit (ECU) of the vehicle configured to receive or determine parking meter data associated with the parking meter. The ECU is configured to determine, based on the parking meter data, whether a time remaining on the parking meter is below a time threshold. The ECU is configured to automatically communicate, to the mobile device, a warning communication indicating the time remaining on the parking meter when the time remaining on the parking meter is below the time threshold and the location data of the mobile device indicates that a location of the mobile device is more than a threshold distance away from a location of the vehicle.

20 Claims, 7 Drawing Sheets

(56) References Cited

U.S. PATENT DOCUMENTS

| | | | |
|---|---|---|---|
| 9,884,621 B2* | 2/2018 | Tarte | B62D 15/027 |
| 9,943,307 B2 | 4/2018 | Kolodziej | |
| 10,096,172 B2 | 10/2018 | Dutta et al. | |
| 2002/0072964 A1 | 6/2002 | Choi | |
| 2003/0128136 A1* | 7/2003 | Spier | G08G 1/14 |
| | | | 340/932.2 |
| 2006/0152349 A1* | 7/2006 | Ratnakar | G07B 15/00 |
| | | | 340/426.1 |
| 2007/0016539 A1* | 1/2007 | Groft | G06Q 30/0284 |
| | | | 705/418 |
| 2009/0292597 A1 | 11/2009 | Schwartz et al. | |
| 2013/0138559 A1 | 5/2013 | Ha et al. | |
| 2013/0191189 A1 | 7/2013 | Aparicio et al. | |
| 2014/0310075 A1 | 10/2014 | Ricci | |
| 2015/0029041 A1 | 1/2015 | Liu et al. | |
| 2015/0161890 A1* | 6/2015 | Huntzicker | G08G 1/147 |
| | | | 340/932.2 |
| 2015/0170518 A1* | 6/2015 | Rodriguez Garza | G08G 1/144 |
| | | | 340/932.2 |
| 2015/0221142 A1* | 8/2015 | Kim | G07C 5/0866 |
| | | | 701/31.5 |
| 2015/0294567 A1* | 10/2015 | De La Plaza Ortega | |
| | | | G08G 1/144 |
| | | | 340/932.2 |
| 2017/0329346 A1* | 11/2017 | Latotzki | G05D 1/0088 |
| 2018/0065624 A1* | 3/2018 | Dudar | G07B 15/02 |
| 2018/0088887 A1 | 3/2018 | LeBlanc et al. | |
| 2018/0113606 A1 | 4/2018 | Crawford et al. | |
| 2018/0232958 A1* | 8/2018 | Wang | G06Q 20/42 |
| 2018/0253715 A1 | 9/2018 | Loeffler et al. | |
| 2018/0336738 A1 | 11/2018 | Gibbs et al. | |
| 2018/0357900 A1* | 12/2018 | Wang | G06Q 20/127 |
| 2019/0043355 A1* | 2/2019 | Ferguson | G01C 21/3438 |
| 2019/0082377 A1* | 3/2019 | Silver | G08G 1/096741 |
| 2019/0390963 A1* | 12/2019 | Kumar | G01C 21/3667 |
| 2020/0302790 A1* | 9/2020 | Humphreys | G08G 1/144 |
| 2020/0305064 A1* | 9/2020 | Silver | G08G 1/096716 |

* cited by examiner

PARKING METER MONITORING AND PAYMENT SYSTEM

BACKGROUND

1. Field

The invention relates to a system and a method for monitoring and paying a parking meter.

2. Description of the Related Art

A parking meter may be used to collect money in exchange for the ability to park at a location. For example, a driver of a vehicle may park at a parking spot along a street or in a parking lot or garage, and the parking spot may have a corresponding parking meter. The parking meter may accept coins or a credit card, and the driver may insert an amount of coins or the credit card corresponding to the amount of time the driver estimates the driver will leave the vehicle parked at the parking spot. For example, if the parking meter rate is $2.00 per hour, and the driver estimates that the vehicle will occupy the parking spot for one and a half hours, the driver may insert $3.00 worth of coins or a credit card into the parking meter. Failure to pay the parking meter may result in receiving a parking ticket.

If the driver returns at or before the estimated one and a half hours, the driver should not have received a parking ticket. However, while away from the vehicle, the driver may forget how long the parking meter has been paid until, and the driver may return later than the one and a half hours that the driver has paid the parking meter. In another situation, the driver may know when the parking meter is due to expire, but may not be physically able to return to the vehicle to either insert more money into the parking meter or move the vehicle. In either of these cases, the driver may find a parking ticket on the windshield of the vehicle upon the driver's arrival at the vehicle. Thus, there is a need for improved parking meter monitoring systems and methods.

SUMMARY

What is described is a system for automatically monitoring a parking meter associated with a vehicle. The system includes a transceiver configured to receive location data of a mobile device associated with a user of the vehicle. The system also includes an electronic control unit (ECU) of the vehicle. The ECU is configured to receive or determine parking meter data associated with the parking meter. The ECU is also configured to determine, based on the parking meter data, whether a time remaining on the parking meter is below a time threshold. The ECU is also configured to automatically communicate, to the mobile device associated with the user via the transceiver, a warning communication indicating the time remaining on the parking meter when the time remaining on the parking meter is below the time threshold and the location data of the mobile device indicates that a location of the mobile device is more than a threshold distance away from a location of the vehicle.

Also described is a system for automatically monitoring parking status of a vehicle parked at a parking location. The system includes an image sensor configured to detect image data associated with one or more street signs or curb markings. The system also includes an electronic control unit (ECU) connected to the image sensor. The ECU is configured to determine a time limit for parking at the parking location based on the image data. The ECU is also configured to determine whether a difference between a time the vehicle has been parked at the parking location and the time limit for parking at the parking location is below a time threshold. The ECU is also configured to automatically communicate, to a mobile device associated with a user of the vehicle via a transceiver, a warning communication indicating a time remaining at the parking location when the difference between the time the vehicle has been parked at the parking location and the time limit for parking at the parking location is below the time threshold.

Also described is a method for automatically monitoring parking status of a vehicle parked at a parking location. The method includes detecting, by an image sensor, image data associated with a parking meter, one or more street signs, or curb markings. The method also includes determining, by the ECU, a time limit for parking at the parking location based on the image data. The method also includes determining, by the ECU, whether a difference between a time the vehicle has been parked at the parking location and the time limit for parking at the parking location is below a time threshold. The method also includes automatically communicating, by the ECU to a mobile device associated with a user of the vehicle via a transceiver of the vehicle, a warning communication indicating a time remaining at the parking location when the difference between the time the vehicle has been parked at the parking location and the time limit for parking at the parking location is below the time threshold.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for monitoring parking. As used herein, "driver" may refer to a human being driving the vehicle when the vehicle is a non-autonomous vehicle, and/or "driver" may also refer to one or more computer processors or systems used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

The systems and methods described herein are capable of determining a time limit that a vehicle may be permitted to be at a parking location, and communicate one or more warnings to the driver of the vehicle as the time limit is being approached. The one or more warnings may remind the driver to return to the vehicle to either move the vehicle or to add more money to the parking meter. In some embodiments, the systems and methods described herein take further action, such as automatically adding more money to the parking meter or automatically moving the vehicle using autonomous driving, to avoid receiving a parking citation. In some situations, the systems and methods find a new parking location prior to the vehicle autonomously moving to the new parking location.

The systems and methods described herein contribute to a more uniform and effective compliance with parking laws, as in many situations drivers of vehicles do not break parking laws maliciously, but instead have either forgotten that the time limit had been reached or were not aware of the time limit at all. The systems and methods described herein also contribute to a more efficient and thoughtful use of parking spaces by vehicles, as vehicles that have reached their time limit will be more promptly moved out of the parking space so that others may use the parking space.

Figure 1:
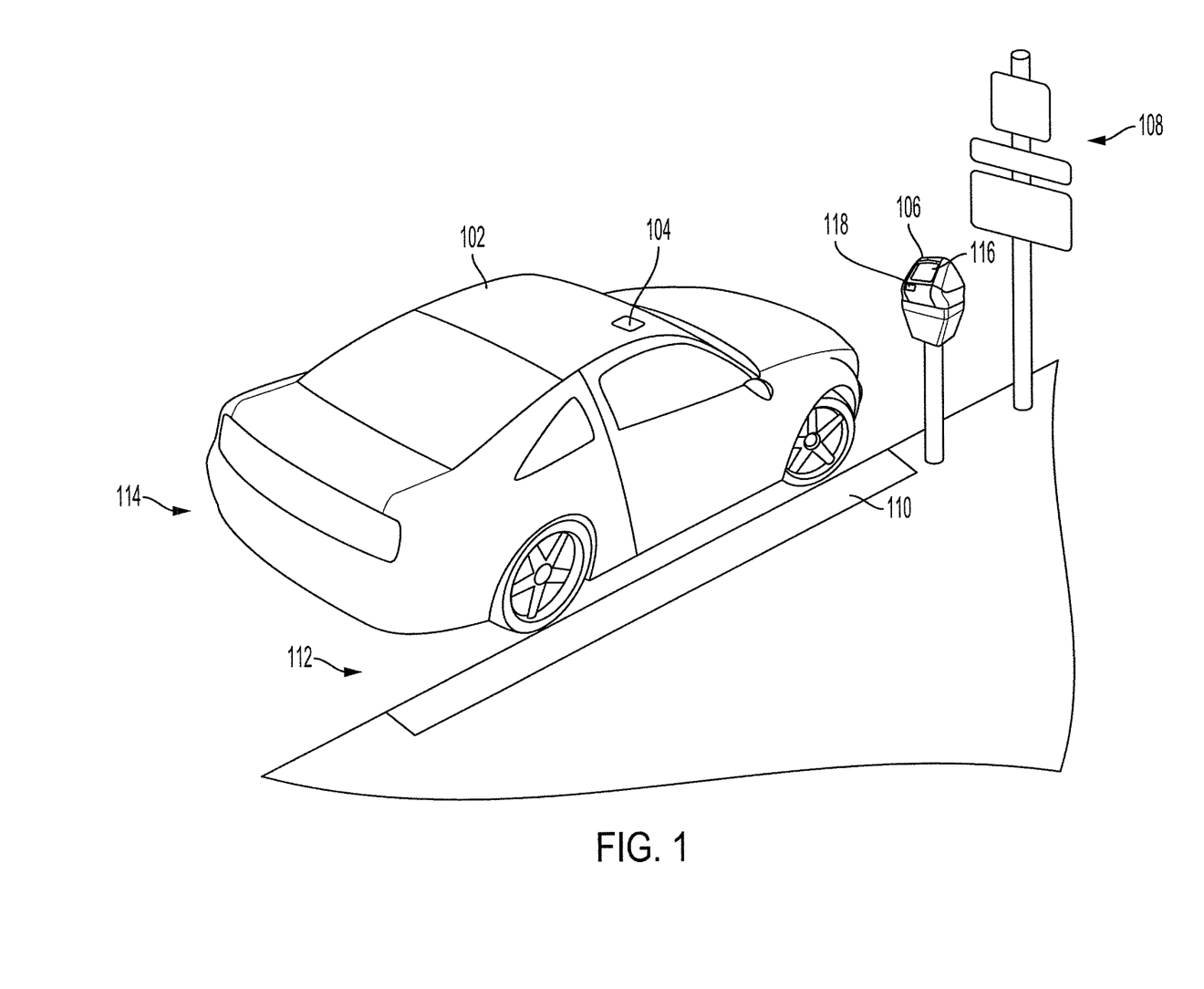
FIG. 1 illustrates a parked vehicle, according to various embodiments of the invention.

FIG. 1 illustrates a vehicle 102 that is parked along a curb 112. The curb 112 may have a parking meter 106 located on or near the curb 112 and associated with a parking spot 114 occupied by the vehicle 102. The parking meter 106 may accept money or a credit card in exchange for time that the vehicle 102 may remain in the parking spot 114 without receiving a citation, such as a parking ticket. Once money is deposited or a credit card inserted into the parking meter 106, a display 116 of the parking meter 106 may indicate a time until the vehicle 102 must be moved or more money deposited or a credit card inserted into the parking meter 106. The parking meter 106 may accept coins, paper currency, credit card, gift cards, cryptocurrency, electronic mobile payments (e.g., Apple Pay, Google Pay, Venmo, etc.) or any other payment method. When the parking meter 106 is capable of accepting credit card, the parking meter 106 may be connected to a network (e.g., the Internet) in order to process the credit card transaction. The parking meter 106 may also have one or more lights 118 indicating a status of the parking meter 106. For example, the one or more lights 118 may flash green when there is time remaining on the parking meter 106, and the one or more lights 118 may flash red when no time remains on the parking meter 106. The parking meter 106 may also have parking meter information written on the parking meter 106 that indicate enforcement conditions. For example, the parking meter 106 may have "2 HOUR MAXIMUM, ENFORCED FROM 10 AM-6 PM, MONDAY THRU SATURDAY" written on the parking meter 106. Thus, if the vehicle 102 were located at the parking spot 114 on a Tuesday at 11 AM, for example, the driver of the vehicle 102 may deposit money to the parking meter 106 in order to avoid receiving a citation. However, if the vehicle 102 were located at the parking spot 114 on a Sunday or any day after 6 PM, the parking meter 106 would not have to be paid in order to avoid receiving a citation.

Parking at the parking spot 114 along the curb 112 may also involve abiding by one or more street signs 108. The street signs 108 may indicate when a vehicle 102 may park at the parking spot 114 or along the curb 112 and for how long. For example, the street signs 108 may state "2 HR PARKING—8 AM to 6 PM, Monday thru Friday." Thus, if the vehicle 102 were in the parking spot 114 during a weekday between 8 AM and 6 PM, the vehicle 102 could remain in the parking spot 114 for a maximum of two hours. After two hours, the vehicle 102 may be issued a citation.

The street signs 108 may also include the parking meter information indicating enforcement conditions. The vehicle 102 may access a parking regulation database to reference previously collected information regarding parking enforcement conditions at the parking spot 114. However, the parking enforcement conditions are subject to change at any time based on adjustment of parking enforcement by the city or municipality. Thus, the vehicle 102 may reference the parking enforcement conditions at the time of parking from one or more street signs 108 and/or the parking meter 106.

The curb may have a curb marking 110. The curb marking 110 may be a color or text indicating parking information associated with parking at the curb. For example, the curb marking 110 may be yellow paint covering the curb with black letters reading "LOADING ZONE." In another example, the curb marking 110 may be green paint covering the curb with white letter reading "15 MIN PARKING."

The vehicle 102 may include an image sensor 104 to detect image data associated with the parking meter 106, the street signs 108, and/or the curb marking 110. The image data may be analyzed by a controller of the vehicle 102 (e.g., an electronic control unit) to determine parking data associated with the parking spot 114. In some embodiments, the image sensor 104 is specially designed to detect image data associated with the parking data. In some embodiments, the image sensor 104 is an image sensor conventionally used for other vehicle systems, such as parking assistance or collision detection, but the systems and methods described herein may use the image sensor 104 in an unconventional manner for detecting parking data.

Figure 2A:
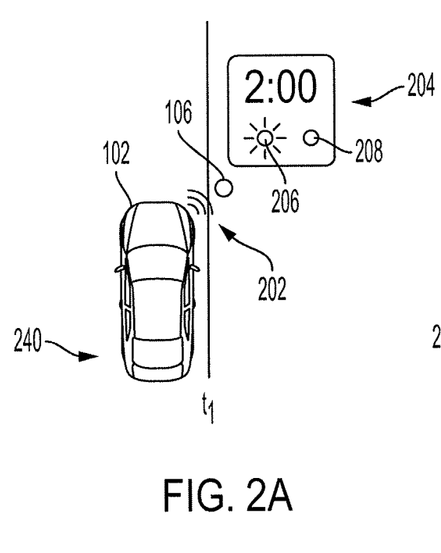
FIGS. 2A-2E illustrate use of the system to monitor and pay a parking meter, according to various embodiments of the invention.

FIGS. 2A-2E illustrate a process of using the system to monitor a parking meter. As illustrated in FIG. 2A, the vehicle 102 is parked at a parking location 240 at time t1. The parking location 240 is located adjacent to a corresponding parking meter 106.

The vehicle 102 may obtain parking meter data 202 associated with the parking meter 106 upon arrival at the parking location 240. In some embodiments, an image sensor (e.g., image sensor 104) of the vehicle 102 is used to detect image data associated with the parking meter 106. The image data associated with the parking meter 106 may include time data associated with the parking meter 106 shown on a display 204 of the parking meter. The image data associated with the parking meter 106 may also include restriction data associated with the parking meter 106 shown on the display 204 or written on the body of the parking meter 106. The image data associated with the parking meter 106 may also include status data associated with the parking meter 106 as indicated by one or more lights (e.g., a paid green light 206 and an expired red light 208).

In some embodiments, a transceiver of the vehicle 102 communicates with the parking meter 106 and receives parking meter data 202 from the parking meter 106. In some embodiments, a transceiver of the vehicle 102 communicates with the parking meter 106 over a network (e.g., the Internet) and receives parking meter data 202 of the parking meter 106 from a server that manages the parking meter 106. The vehicle 102 may obtain the parking meter data 202 upon arrival at the parking location 240. The vehicle 102 may display the obtained parking meter data 202 to the driver of the vehicle 102. In some embodiments, the obtained parking meter data 202 is displayed on a display screen of an infotainment unit of the vehicle 102. In some embodiments, the obtained parking meter data is communicated from the vehicle 102 to a mobile device of the driver and displayed on the display screen of the mobile device of the driver.

The driver may use the displayed parking meter data 202 to determine whether to park at the parking location 240 or to move to another parking location. In some embodiments, the image sensor of the vehicle 102 is able to detect image data associated with multiple parking meters, and the vehicle 102 may suggest another unoccupied parking location associated with a parking meter that has more favorable parking conditions (e.g., more time left on the parking meter, fewer parking restrictions, lower cost to park, etc.). In some embodiments, the transceiver of the vehicle 102 is able to receive parking meter data associated with multiple parking meters, including whether their respective spaces are occupied. The vehicle 102 may suggest another unoccupied parking location associated with a parking meter that has more favorable parking conditions.

As shown in FIG. 2A, the parking meter 106 has a display 204 that indicates that the parking meter 106 has 2 hours and 0 minutes until the parking meter 106 expires and the vehicle 102 is eligible to receive a citation. The paid light 206 may be illuminated, and the expired light 208 is not illuminated. The driver of the vehicle 102 may have paid the parking meter 106 using coins, paper currency, using a credit card, or using a digital payment method.

Figure 2B:
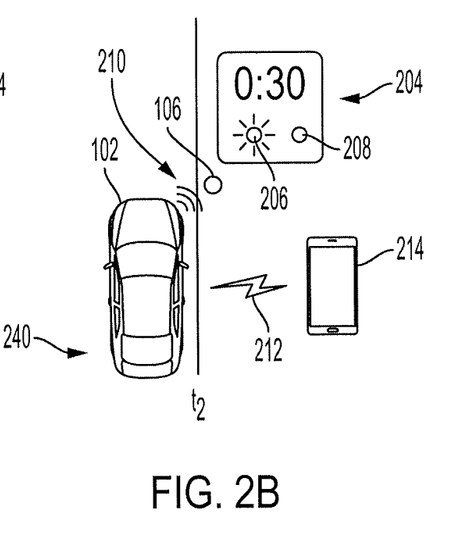

As shown in FIG. 2B, at time t2 later than time t1, the parking meter 106 has 0 hours and 30 minutes left until the parking meter 106 expires and the vehicle 102 is eligible to receive a citation. The vehicle 102 may obtain parking meter data 210 including the time remaining on the parking meter 106. As described herein, the vehicle 102 may obtain the parking meter data 210 using an image sensor and analysis of the display 204 of the parking meter or the vehicle 102 may obtain the parking meter data 210 using a transceiver and receiving the parking meter data 210 from the parking meter 106. In some embodiments, the parking meter data is continuously obtained by the vehicle 102. In some embodiments, the parking meter data is periodically obtained by the vehicle 102 (e.g., every minute, every 10 minutes, every 30 minutes). The frequency of obtaining the parking meter data may be set by the vehicle manufacturer or may be set by the user or any other entity that is permitted to do so. The frequency of obtaining the parking meter data may be adjusted to be any time frequency.

Upon obtaining the parking meter data 210, the vehicle 102 may send a warning communication 212 to a mobile device 214 associated with the driver over a network of devices (e.g., the Internet). The warning communication 212 may be sent by the vehicle 102 when the time remaining on the parking meter is at or below a threshold time (e.g., 10 minutes). The threshold time may be set by the vehicle manufacturer, the user, or any other entity that is permitted to do so.

The vehicle 102 may receive location data associated with the mobile device 214 and the warning communication 212 may be sent by the vehicle 102 as a function of the distance between the location of the mobile device 214 and the vehicle 102. For example, when the distance between the location of the mobile device 214 and the vehicle 102 has an associated walking time that is greater than the amount of time remaining on the parking meter 106, the warning communication 212 may be sent by the vehicle 102. That is, when the driver is too far away from the vehicle 102 to return to the vehicle 102 before the parking meter expires, the warning communication 212 may be sent by the vehicle 102. As an example, the warning communication 212 may be sent to the mobile device 214 at least 5 minutes longer than the associated walking or travel time to the vehicle 102.

The warning communication 212 may indicate an amount of time remaining on the parking meter 106 (e.g., "30 minutes remaining") and/or a time when the parking meter 106 will expire (e.g., "meter will expire at 3:55 PM"). The warning communication 212 may also present an option for the driver to remotely add more money to the parking meter 106. In some embodiments, the parking meter 106 is a network-connected parking meter 106 that is capable of accepting payment from a mobile device 214 or the vehicle 102. In some embodiments, the vehicle 102 has payment data associated with a payment method of the driver (e.g., a credit card number) and the driver may authorize the vehicle 102 to add more money to the parking meter 106 using the payment data stored in the vehicle 102 or the user's account associated with the vehicle 102. If the maximum time for that parking space has been reached, the warning communication 212 will notify the driver that no additional money can be paid and the vehicle 102 needs to be moved.

Figure 2C:
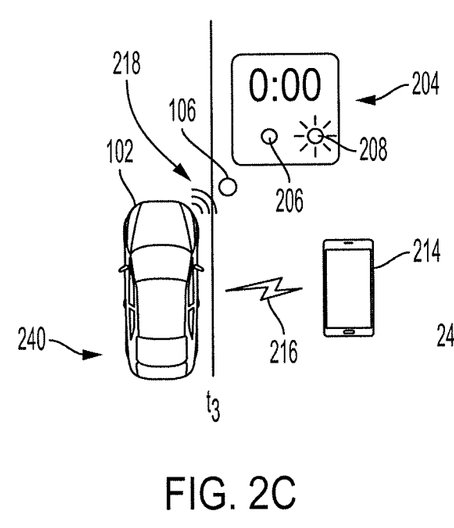

As shown in FIG. 2C, at time t3 later than time t2, the parking meter 106 has no time left and the parking meter 106 has expired. The expired light 208 is illuminated and the paid light 206 is not illuminated. The vehicle 102 is eligible to receive a citation. The vehicle 102 may obtain parking meter data 218 including the time remaining on the parking meter 106. As described herein, the vehicle 102 may obtain the parking meter data 218 using an image sensor and analysis of the display 204 of the parking meter or the vehicle 102 may obtain the parking meter data 218 using a transceiver and receiving the parking meter data 218 from the parking meter 106.

Upon obtaining the parking meter data 218, the vehicle 102 may send a warning communication 216 to a mobile device 214 associated with the driver. The warning communication 216 may be sent by the vehicle 102 when the time remaining on the parking meter has expired. In some embodiments, warning communications may be sent at multiple thresholds (e.g., when the parking meter has 30 minutes remaining, 15 minutes remaining, 5 minutes remaining, no time remaining). The warning communication 216 may be sent over a network of devices (e.g., the Internet or peer-to-peer communications).

In some embodiments, when the parking meter 106 has a baseline amount of time remaining, the vehicle 102 automatically adds money or time to the parking meter 106. For example, when the parking meter 106 has only 2 minutes remaining, the vehicle 102 automatically adds money to the parking meter 106. As the rates for various parking meters may vary, the vehicle 102 may add the equivalent cost of a time amount to the parking meter 106. For example, the vehicle 102 may automatically add 15 minutes to the parking meter 106 when the parking meter 106 has only 2 minutes remaining. In some parking meters, 15 minutes may cost $1 and at other parking meters, 15 minutes may cost $0.25. Some parking meters may charge a cost of parking variably based on the date and time. The vehicle 102 may dynamically determine the cost required for the predetermined amount of refill time. In some embodiments, the vehicle 102 adds a predetermined amount of money to the parking meter 106 regardless of how much time is associated with the amount of money. For example, the vehicle 102 may automatically add $0.50 to the parking meter 106 when the parking meter has only 2 minutes remaining. In some parking meters, $0.50 may extend the time of the parking meter by an hour, and in other parking meters, $0.50 may extend the time of the parking meter by 10 minutes.

The baseline amount of time remaining may be set by the vehicle manufacturer, the user, or any other entity that is permitted to do so. The baseline amount of time may be the lowest time threshold of one or more time thresholds that may trigger the sending of a warning communication, when each of the one or more time thresholds are exceeded. For example, there may be time thresholds of 30 minutes, 15 minutes, 5 minutes, and 2 minutes. When the time remaining on the parking meter reaches 30 minutes, a warning communication may be sent. Similarly, respective warning communications may be sent when the time remaining on the parking meter reaches each of 15 minutes, 5 minutes, and 2 minutes. The 2-minute time threshold may be the baseline amount of time.

The amount of time or money that the vehicle 102 automatically adds to the parking meter may be set by the vehicle manufacturer, the user, or any other entity that is permitted to do so. These values, and any other values described herein may be changed by the vehicle manufacturer, the user, or any other entity that is permitted to do so.

The vehicle 102 may receive location data associated with the mobile device 214 and when the mobile device 214 is within a threshold distance of the vehicle 102, the warning communication 216 may not be sent by the vehicle 102, as the driver may be close enough to the vehicle 102 that the driver can refill the parking meter or the driver may choose to drive away or summon the vehicle 102 from the parking location 240. For example, when the threshold distance is 500 feet, and the location of the mobile device 214 and the location of the vehicle 102 is 250 feet, the warning communication 216 may not be sent by the vehicle 102.

The warning communication 216 may indicate that no time is remaining on the parking meter 106. The warning communication 216 may also present an option for the driver to remotely add more money to the parking meter 106. In some embodiments, the parking meter 106 is a network-connected parking meter 106 that is capable of accepting payment from a mobile device 214 or the vehicle 102. In addition, the warning communication 216 may present an option for the user to summon the vehicle 102 to a pick-up location when the vehicle 102 is capable of operating autonomously.

Figure 2D:
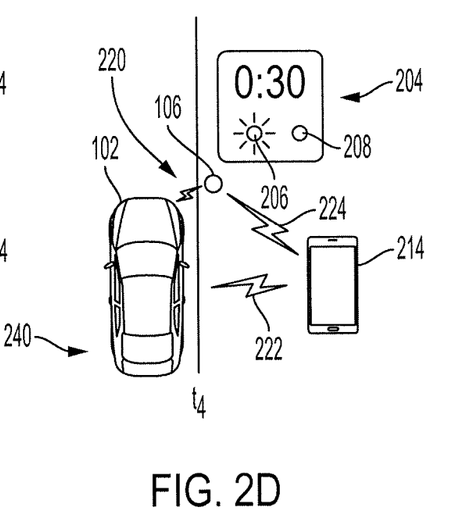

FIG. 2D illustrates at time t4 later than time t3, the vehicle 102 may send a communication 220 to the parking meter 106 to add additional time to the parking meter 106. The vehicle 102 may automatically send the communication 220 to the parking meter 106, as described herein. The mobile device 214 may send a communication 222 to the vehicle 102 to send the communication 220 to the parking meter 106. The mobile device 214 may send a communication 224 to the parking meter 106 to add additional time to the parking meter 106. The communications 220, 222, and 224 may be sent directly from device to device or may be sent over a network of devices (e.g., the Internet).

Figure 2E:
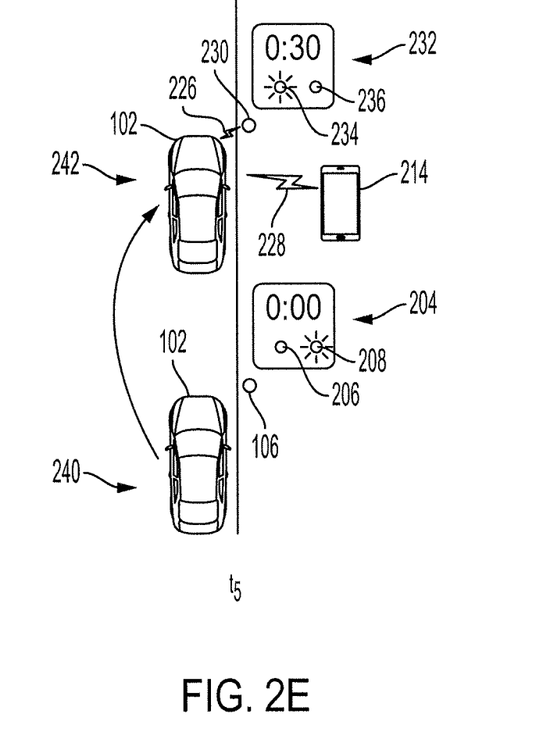

In some embodiments, instead of adding money to the parking meter 106, the vehicle 102 may automatically relocate itself to another parking location using autonomous driving. As illustrated in FIG. 2E, at time t5 later than time t3, the vehicle 102 may autonomously drive from the parking location 240 to a new parking location 242. The vehicle 102 may autonomously drive away from the parking location 240 if the parking meter 106 does not receive additional money from the vehicle 102 or the mobile device 214 to refill the parking meter 106 and the time remaining on the parking meter is expired. The parking meter 106 may have a limit of remote payments accepted from a particular vehicle and/or mobile device. The vehicle 102 may autonomously drive away from the parking location 240 if the parking regulations associated with the parking location 240 indicate that a vehicle must relocate after a particular amount of time, regardless of parking meter payment. For example, the parking regulation for the parking location 240 may state "MAXIMUM PARKING TIME OF 2 HOURS." Therefore, the vehicle 102 will need to be moved after 2 hours has elapsed.

When the vehicle 102 autonomously drives from the parking location 240 to the new parking location 242, the vehicle 102 may obtain parking meter data from the new parking meter 230 in a similar manner as with parking meter 106, described herein and illustrated in FIG. 2A. The vehicle 102 may send a payment communication 226 to the new parking meter 230. The vehicle 102 may send a communication 228 to the mobile device 214. The communication 228 may include location data associated with the new parking location 242. The communication 228 may also include an amount of time that is on the new parking meter 230 and/or a time when the new parking meter 230 will expire. The mobile device 214 may use navigation software to guide the driver to the new parking location 242 using the location data received from the vehicle 102. The vehicle 102 and/or the mobile device 214 may also search for and obtain a new parking location 242 that is an open parking space prior to autonomously moving to that parking space.

Similar to the parking meter 106, which included a display 204 and a paid light 206 and an expired light 208, the new parking meter 230 includes a display 232 and a paid light 234 and an expired light 236, which the vehicle 102 may use to determine parking meter data.

In determining where to autonomously drive to, the vehicle 102 may access local parking data associated with the neighborhood around the vehicle 102. The local parking data may be compiled by other vehicles and communicated from vehicle-to-vehicle or communicated via a remote server. The local parking data may be compiled by a service using monitoring devices, such as road sensors, parking garage sensors, satellites, drones or unmanned aerial vehicles. The local parking data may indicate specific locations where there is parking available. The local parking data may also indicate parking regulations associated with the available parking locations. The local parking data may indicate a size of a parking space available or a number of parking spaces available. For example, the local parking data may indicate that there are five parking spaces within a 0.5 mile radius of the parking location 240. In some embodiments, the vehicle 102 may only leave the current parking location 240 for a new parking location when the local parking data indicates that there are more than a threshold number of parking spaces available (e.g., 2) within a threshold distance (e.g., 0.5 miles). The threshold number of parking spaces and the threshold distance may be configurable by the driver. Finding a new parking location before the vehicle is autonomously moved advantageously allows the vehicle to quickly move to a new parking location without having to drive around searching for a new parking location.

In some situations, the driver of the vehicle 102 may prefer to take a risk with receiving a parking ticket as compared to walking a farther distance to a new parking location that the vehicle 102 has autonomously driven to. Also, there may be no available parking spaces within a threshold distance so the driver may opt to take a risk with receiving a parking ticket as opposed to the vehicle autonomously driving around searching for an open parking space. In some embodiments, the mobile device 214 presents an option for the driver to authorize autonomous relocation of the vehicle 102. The mobile device 214 may display a map of available parking locations, the cost for each available parking location, an expected parking ticket cost, and/or a probability of receiving a parking ticket based on historical parking ticket data. The vehicle 102 may also determine the number of times and the frequency (e.g., every 30 minutes) a parking enforcement vehicle (or person) passes the vehicle when parked at the parking location to determine the probability of receiving a parking ticket. For example, the cameras on the vehicle 102 can scan the outside of the vehicle and identify using OCR, vehicles or persons that are indicated as Parking Enforcement. The number of times and the frequency information can be sent from the vehicle 102 to the mobile device 214 of the driver of the vehicle so the driver can use this information in determining whether to request the vehicle to be autonomously moved.

In some situations, paying a parking meter is only required during particular hours of the day. For example, the parking meter may only have to be paid between the hours of 8 AM and 6 PM, and any other time may be unrestricted, free parking. The vehicle 102 may be aware of these conditions and may factor these conditions into determining whether additional money should be automatically paid to the parking meter, whether the driver should be sent a warning communication, or whether the vehicle should automatically be driven to a different location. For example, the parking meter may be enforced between 8 AM and 6 PM, the driver may have paid for the parking meter until 6 PM, and the time threshold for the vehicle to send a warning communication may be 30 minutes. At 5:30 PM, the vehicle may not send a warning communication to the mobile device of the driver, even though the parking meter has 30 minutes remaining because when the 30 minutes are over, the parking meter does not have to be paid. Similarly, no additional money may be sent from the vehicle to the parking meter at 6 PM and the vehicle may not automatically search for another parking location at 6 PM.

Figure 3A:
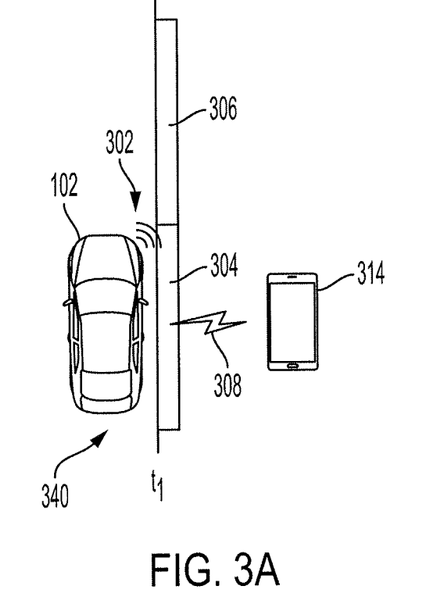
FIGS. 3A-3C illustrate use of the system to monitor parking based on curb information, according to various embodiments of the invention.

In addition to detecting parking meters, the systems and methods described herein may be used with parking spaces with curb markings. FIG. 3A illustrates a vehicle 102 at a parking location 340 at time t1. The parking location 340 may be along a curb having a curb marking 304. As described herein, the curb marking 304 may be a color of the curb and/or words written on the curb. There may be multiple different curb markings along the same curb. For example, there is a curb marking 304 associated with the parking location 340 and there is a second curb marking 306 associated with another parking location.

The vehicle 102 may detect curb data 302 associated with the curb marking 304. The curb data 302 may include a color of the curb marking 304 and/or any words, letters, or numbers on the curb. For example, the curb data 302 may indicate that the curb marking 304 is a green colored curb with white letters that say "15 MINUTE PARKING."

The vehicle 102 may send a communication 308 of parking data to a mobile device 314 of the driver. The mobile device 314 may display, on a display screen of the mobile device 314, a length of time (e.g., "15 minutes") that the vehicle 102 may be parked at the parking location 340 based on the detected curb data. The mobile device 314 may also display, on a display screen of the mobile device 314, a time (e.g., "4:51 PM") when the vehicle 102 should be moved based on the detected curb data. The mobile device 314 can also automatically set an alarm or vibration to notify the driver that the length of time has expired.

In some situations, different jurisdictions may have different rules regarding curb markings. For example, in a first jurisdiction, a vehicle may not stop at a yellow curb at any time of day or night; in a second jurisdiction, a vehicle may park at a yellow curb after 8 PM and before 6 AM. The vehicle 102 may use a transceiver to retrieve parking regulations applicable to the location of the vehicle 102 to determine the parking data to communicate to the mobile device 314. The retrieval of the applicable parking regulations may be performed using location data detected by a location device of the vehicle 102 (e.g., a GPS device).

In some embodiments, the parking data is displayed on the mobile device 314. In some embodiments, the parking data is displayed on a display screen of an infotainment unit of the vehicle 102, and visible to the driver of the vehicle before the driver exits the vehicle 102 or visible to any occupant of the vehicle 102.

Figure 3B:
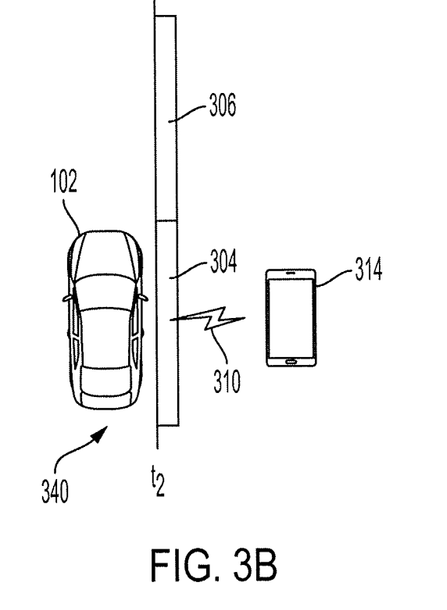

FIG. 3B illustrates the vehicle 102 at the parking location 340 at a time t2 later than t1. Based on the curb marking 304, the vehicle 102 is approaching a time limit of parking at the parking location 340 or has reached the time limit of parking at the parking location 340.

In some embodiments, the vehicle 102 sends a warning communication 310 to a mobile device 314 associated with the driver when the time limit of parking at the parking location 340 is within a threshold amount of time. For example, when the time limit of parking at the parking location 340 is two hours and the threshold amount of time is 30 minutes, when the vehicle 102 has been parked at the parking location 340 for 30 minutes, the vehicle 102 sends the warning communication 310 to the mobile device 314. The threshold time may be set by the vehicle manufacturer, the user, or any other entity.

In some embodiments, additional warning communications may be sent in predetermined and adjustable intervals until the time limit of parking at the parking location 340 is reached. The vehicle 102 may receive location data associated with the mobile device 314 and the warning communication 310 may be sent by the vehicle 102 as a function of the distance between the location of the mobile device 314 and the vehicle 102, as described herein.

The vehicle may send a warning communication 310 when the time limit of parking at the parking location 340 is finally reached. If the vehicle 102 has not been moved even after the time limit is reached, the vehicle 102 may nevertheless continue to send warning communications to the mobile device 314 indicating that the time limit of parking at the parking location 340 has been reached and/or an amount of time that has elapsed since the time limit has been reached. The warning communication may state "Parking Meter Time has Expired."

The vehicle 102 may receive location data associated with the mobile device 314 and when the mobile device 314 is within a threshold distance of the vehicle 102, the warning communication 310 may not be sent by the vehicle 102, as the driver may be close enough to the vehicle 102 that the driver can drive away from the parking location 340 or the driver may choose to summon the vehicle 102.

The warning communication 310 may indicate an amount of time remaining before the time limit of parking at the parking location 340 is reached (e.g., "30 minutes remaining") and/or a time when the time limit of parking at the parking location 340 will be reached (e.g., "parking allowed until 3:55 PM").

Figure 3C:
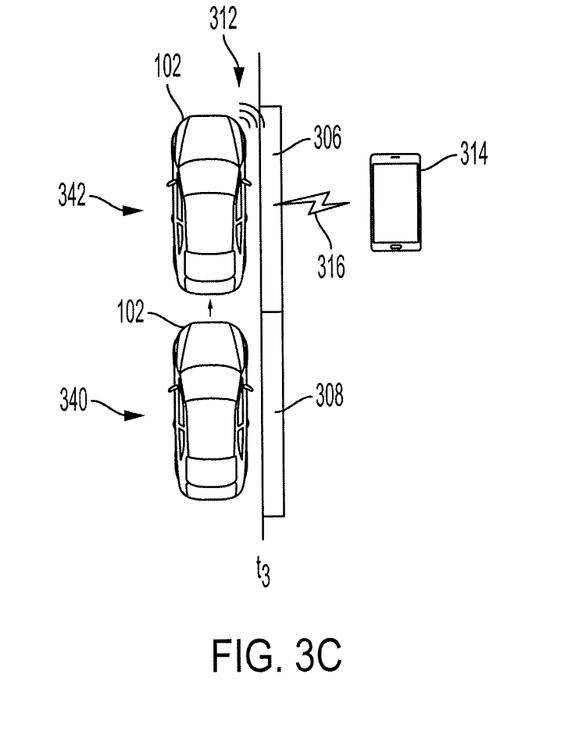

As shown in FIG. 3C, at time t3 later than time t2, after the time limit of parking at the parking location 340 has been reached, the vehicle 102 may autonomously drive from the parking location 340 to a new parking location 342.

When the vehicle 102 autonomously drives from the parking location 340 to the new parking location 342, the vehicle 102 may detect curb data 312 of the new curb markings 306 in a similar manner as with curb markings 304, described herein and illustrated in FIG. 3A. The vehicle 102 may send a communication 316 to the mobile device 314 including location data associated with the new parking location 342. The communication 316 may also include an amount of time that the vehicle 102 may be parked at the new parking location 342 and/or a time when the time limit for parking at the new parking location 342 will expire. The mobile device 314 may use navigation software to guide the driver to the new parking location 342 using the location data received from the vehicle 102. In addition, the mobile device 314 may provide an option to summon the vehicle 102 to the location of the driver when the vehicle 102 is capable of operating autonomously.

In determining where to autonomously drive to, the vehicle 102 may access local parking data associated with the neighborhood around the vehicle 102. The local parking data may be compiled by other vehicles and communicated from vehicle-to-vehicle or communicated via a remote server. The local parking data may be compiled by a service using monitoring devices, such as road sensors, parking garage sensors, satellites, drones or unmanned aerial vehicles. The local parking data may indicate specific locations where there is parking available. The local parking data may also indicate parking regulations associated with the available parking locations. The local parking data may indicate a size of a parking space available or a number of parking spaces available, and the vehicle 102 may only leave the current parking location 340 for a new parking location when the local parking data indicates that there are more than a threshold number of parking spaces available within a threshold distance and/or the size of the parking space is able to fit the vehicle 102. The threshold number of parking spaces and the threshold distance may be configurable by the driver.

In some situations, the driver of the vehicle 102 may prefer to take a risk with receiving a parking ticket as compared to walking a farther distance to a new parking location that the vehicle 102 has autonomously driven to. In some embodiments, the mobile device 314 presents an option for the driver to authorize autonomous relocation of the vehicle 102. The mobile device 314 may display a map of available parking locations, an expected parking ticket cost, and/or a probability of receiving a parking ticket based on historical parking ticket data.

Figure 4A:
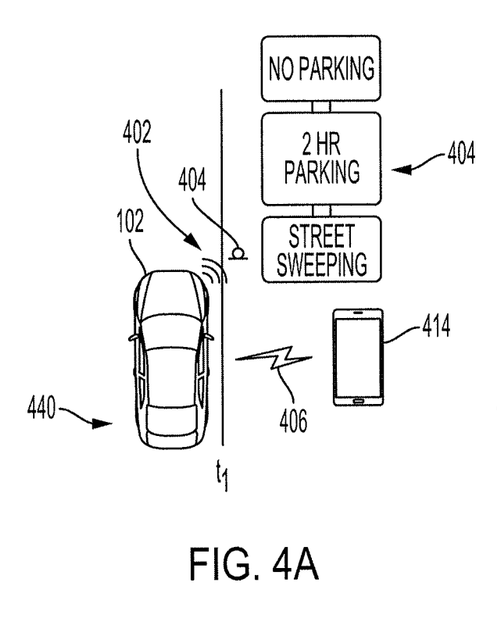
FIGS. 4A-4C illustrate use of the system to monitor parking based on street signs, according to various embodiments of the invention.

In addition to detecting parking meters and curb markings, the systems and methods described herein may be used with parking spaces with street signs. FIG. 4A illustrates a vehicle 102 at a parking location 440 at time t1. The parking location 440 may be along a curb having an associated street sign 404. As described herein, the street sign 404 may include one or more signs, each having one or more conditions. There may be multiple different street signs along the same street. For example, there is a street sign 404 associated with the parking location 340 and there may be a second street sign farther down the street associated with another parking location.

The vehicle 102 may detect street sign data 402 associated with the street sign 404. The street sign data 402 may include a color of the street sign, words on the street sign, and shape of the street sign. For example, the street sign data 402 may indicate that there is no parking from 4 AM-6 AM on any day of the week, that there is two-hour parking from 6 AM-6 PM on weekdays, and that there is no parking due to street sweeping from 8 AM-10 AM on Tuesdays.

The vehicle 102 may send a communication 406 of parking data to a mobile device 414 of the driver. The mobile device 414 may display, on a display screen of the mobile device 414, a length of time (e.g., "15 minutes") that the vehicle 102 may be parked at the parking location 440 based on the detected street sign data. The mobile device 414 may also display, on a display screen of the mobile device 414, a time (e.g., "4:51 PM") when the vehicle 102 should be moved based on the detected curb data.

In some embodiments, the parking data is displayed on a display screen of an infotainment unit of the vehicle 102, and visible to the driver of the vehicle before the driver exits the vehicle 102 or visible to any occupant of the vehicle 102.

In many situations when there are multiple signs in the street sign 404, it may be difficult for a human being to parse the many conditions of the street signs to determine whether the vehicle 102 may be parked. For example, the parking sign may include multiple signs reading, "No Parking 11 AM-1 PM Tuesday Street Cleaning," "Tow Away School Days, No Stopping Monday through Friday, 7 AM-4 PM," "School Days Exceptions 15 Minute Parking Monday through Friday, 7:30 AM-8:30 AM School Business," "1 Hour Parking Monday through Friday 4 PM-6 PM," "1 Hour Parking Non-School Days, Sunday 12 Midnight through Friday 6 PM," "No Stopping Friday 6 PM-Sunday 12 Midnight." It may be confusing for a human being to interpret these signs, but a computing device with data regarding how various parking sign words are interpreted may be able to more accurately and more rapidly determine whether a vehicle may park there at any given day and time. The image data associated with the one or more parking signs are analyzed by the one or more processors (e.g., electronic control units) of the vehicle 102 and may automatically inform the driver whether the vehicle may be parked.

Figure 4B:
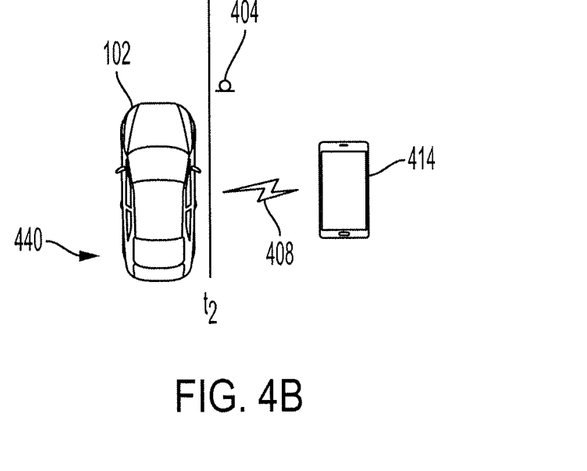

FIG. 4B illustrates the vehicle 102 at the parking location 440 at a time t2 later than t1. Based on the street sign 404, the vehicle 102 is approaching a time limit of parking at the parking location 440 or has reached the time limit of parking at the parking location 440.

In some embodiments, the vehicle 102 sends a warning communication 408 to a mobile device 414 associated with the driver when the time limit of parking at the parking location 440 is within a threshold amount of time. For example, when the time limit of parking at the parking location 440 is one hour and the threshold amount of time is 15 minutes, when the vehicle 102 has been parked at the parking location 440 for 15 minutes, the vehicle 102 sends the warning communication 408 to the mobile device 414. The threshold time may be set by the vehicle manufacturer, the user, or any other entity.

In some embodiments, additional warning communications may be sent in predetermined and adjustable intervals until the time limit of parking at the parking location 440 is reached. The vehicle 102 may receive location data associated with the mobile device 414 and the warning communication 408 may be sent by the vehicle 102 as a function of the distance between the location of the mobile device 414 and the vehicle 102, as described herein.

The vehicle may send a warning communication 408 when the time limit of parking at the parking location 440 is finally reached. If the vehicle 102 has not been moved even after the time limit is reached, the vehicle 102 may nevertheless continue to send warning communications to the mobile device 414 indicating that the time limit of parking at the parking location 440 has been reached and/or an amount of time that has elapsed since the time limit has been reached.

The vehicle 102 may receive location data associated with the mobile device 414 and when the mobile device 414 is within a threshold distance of the vehicle 102, the warning communication 408 may not be sent by the vehicle 102, as the driver may be close enough to the vehicle 102 that the driver can drive away from the parking location 440.

The warning communication 408 may indicate an amount of time remaining before the time limit of parking at the parking location 440 is reached (e.g., "30 minutes remaining") and/or a time when the time limit of parking at the parking location 440 will be reached (e.g., "parking allowed until 3:55 PM").

Figure 4C:
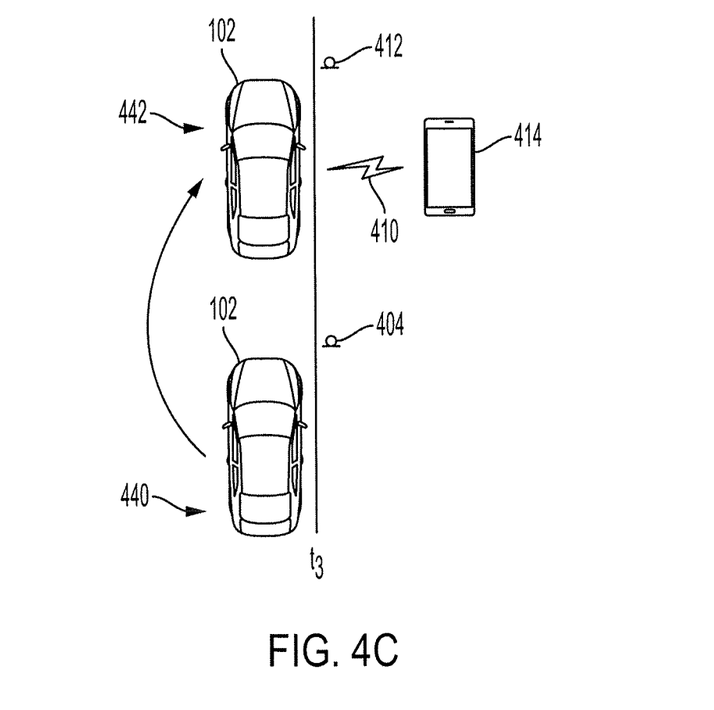

As shown in FIG. 4C, at time t3 later than time t2, after the time limit of parking at the parking location 440 has been reached, the vehicle 102 may autonomously drive from the parking location 440 to a new parking location 442.

When the vehicle 102 autonomously drives from the parking location 440 to the new parking location 442, the vehicle 102 may detect street sign data of the new street sign 412 in a similar manner as with street sign 404, described herein and illustrated in FIG. 4A. The vehicle 102 may send a communication 410 to the mobile device 414 including location data associated with the new parking location 442. The communication 410 may also include an amount of time that the vehicle 102 may be parked at the new parking location 442 and/or a time when the time limit for parking at the new parking location 442 will expire. The mobile device 414 may use navigation software to guide the driver to the new parking location 442 using the location data received from the vehicle 102.

In determining where to autonomously drive to, the vehicle 102 may access local parking data associated with the neighborhood around the vehicle 102. The local parking data may be compiled by other vehicles and communicated from vehicle-to-vehicle or communicated via a remote server. The local parking data may be compiled by a service using monitoring devices, such as road sensors, parking garage sensors, satellites, drones or unmanned aerial vehicles. The local parking data may indicate specific locations where there is parking available. The local parking data may also indicate parking regulations associated with the available parking locations. The local parking data may indicate a size of a parking space available or a number of parking spaces available, and the vehicle 102 may only leave the current parking location 440 for a new parking location when the local parking data indicates that there are more than a threshold number of parking spaces available within a threshold distance and/or the size of the parking space is able to fit the vehicle 102. The threshold number of parking spaces and the threshold distance may be configurable by the driver.

In some situations, the driver of the vehicle 102 may prefer to take a risk with receiving a parking ticket as compared to walking a farther distance to a new parking location that the vehicle 102 has autonomously driven to. In some embodiments, the mobile device 414 presents an option for the driver to authorize autonomous relocation of the vehicle 102. The mobile device 414 may display a map of available parking locations, an expected parking ticket cost, and/or a probability of receiving a parking ticket based on historical parking ticket data.

Figure 5:
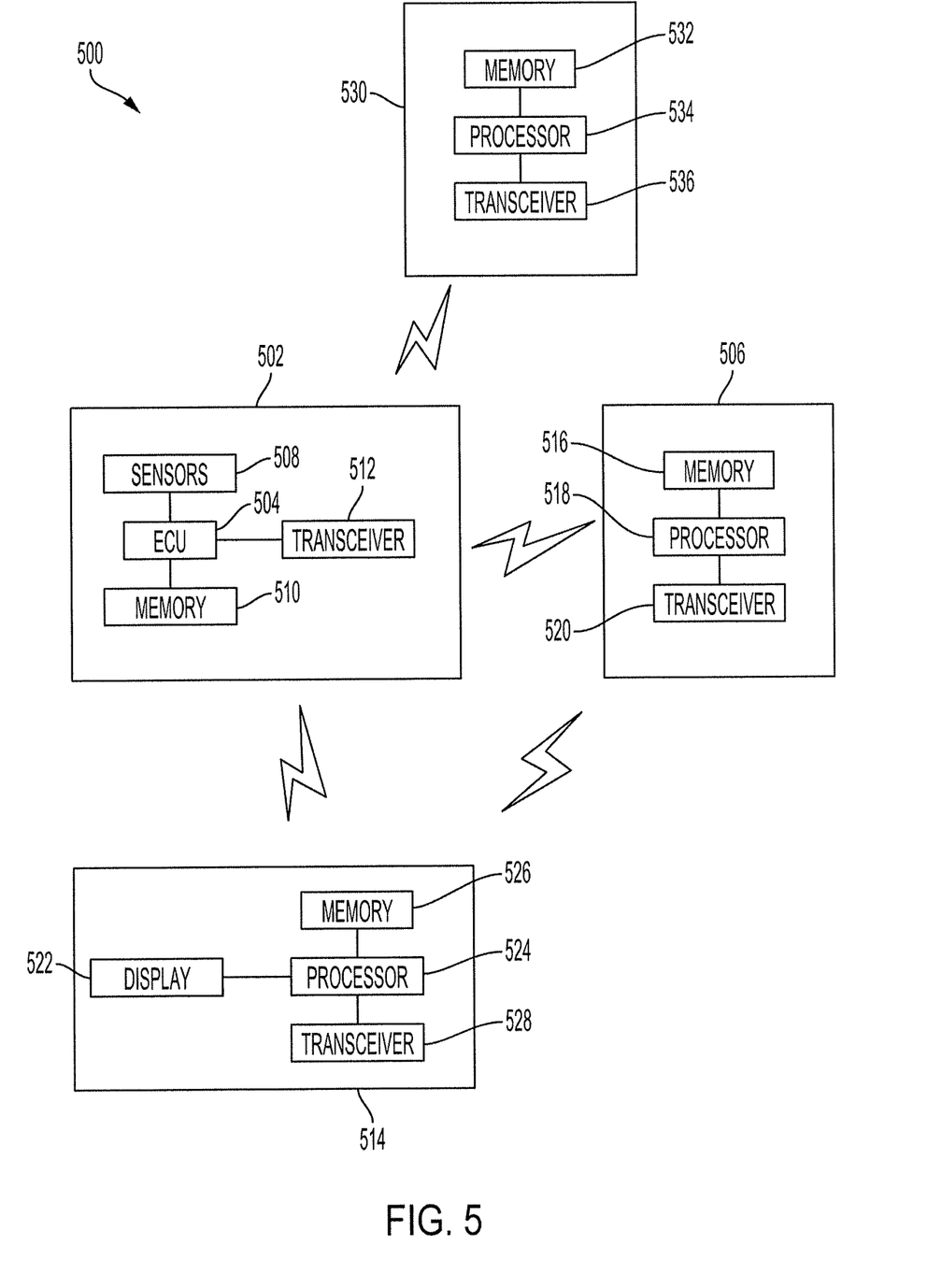
FIG. 5 illustrates the components of the system, according to various embodiments of the invention.

FIG. 5 illustrates a block diagram of the system 500. The system 500 includes a vehicle 502. The vehicle 502 may be similar to any of the vehicles described herein, such as vehicle 102.

The vehicle 502 may have an automatic or manual transmission. The vehicle 502 is a conveyance capable of transporting a person, an object, or a permanently or temporarily affixed apparatus. The vehicle 502 may be a self-propelled wheeled conveyance, such as a car, a sports utility vehicle, a truck, a bus, a van or other motor or battery driven vehicle. For example, the vehicle 502 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 502 may be a semi-autonomous vehicle or an autonomous vehicle. That is, the vehicle 502 may be self-maneuvering and navigate without human input. An autonomous vehicle may use one or more sensors and/or a navigation unit to drive autonomously.

The vehicle 502 includes an ECU 504 connected to a transceiver 512, sensors 508, and a memory 510. The ECU 504 may be one or more ECUs, appropriately programmed, to control one or more operations of the vehicle. The one or more ECUs 504 may be implemented as a single ECU or in multiple ECUs. The ECU 504 may be electrically coupled to some or all of the components of the vehicle. In some embodiments, the ECU 504 is a central ECU configured to control one or more operations of the entire vehicle. In some embodiments, the ECU 504 is multiple ECUs located within the vehicle and each configured to control one or more local operations of the vehicle. In some embodiments, the ECU 504 is one or more computer processors or controllers configured to execute instructions stored in a non-transitory memory 510. All of the elements of the vehicle 502 may be connected via a communications bus.

The ECU 504 may be configured to monitor a time the vehicle 502 arrived at a particular parking location and a time remaining at the parking location. The ECU 504 may also be configured to compare an amount of time the vehicle has been at the parking location and the time remaining at the parking location.

The sensors 508 may include one or more image sensors configured to detect image data of the environment around the vehicle 502. The image data may be used to determine parking meter data, curb data, and/or street sign data. The image sensor may be a camera or video camera. The sensors 508 may include one or more object sensors configured to detect objects of the environment around the vehicle 502. The object data may be used to determine available parking space, the presence of objects on the road, or the presence of pedestrians, for example. The object sensors may be RADAR, LIDAR, or ultrasound, for example.

The sensors 508 may also include a location sensor configured to detect location data associated with the vehicle 502. The ECU 504 may use the location data along with map data stored in memory 510 to determine a location of the vehicle. In some embodiments, the location sensor has access to the map data and may determine the location of the vehicle and provide the location of the vehicle to the ECU 504. The location sensor may be a GPS unit or any other global location detection device. The location data may be used to determine a distance between the vehicle 502 and the mobile device 514. The location data may also be communicated to the mobile device 514 to allow navigation software of the mobile device 514 to guide the driver to the location of the vehicle 502.

The vehicle 502 may be coupled to a network. The network, such as a local area network (LAN), a wide area network (WAN), a cellular network, a digital short-range communication (DSRC), LORA (Long Range), the Internet, or any other type of interconnectivity or combinations thereof, connects the vehicle 502 to other devices, such as a remote data server 530, a parking meter 506, and/or the mobile device 514.

The transceiver 512 may include a communication port or channel, such as one or more of a Wi-Fi unit, a Bluetooth® unit, a Radio Frequency Identification (RFID) tag or reader, a DSRC unit, a LORA unit, or a cellular network unit for accessing a cellular network (such as 3G, 4G, or 5G) or any other wireless technology. The transceiver 512 may transmit data to and receive data from devices and systems not physically connected to the vehicle. For example, the ECU 504 may communicate with the remote data server 530, the parking meter 506, and/or the mobile device 514. Furthermore, the transceiver 512 may access the network, to which the remote data server 530, the parking meter 506, and/or the mobile device 514 are also connected.

The memory 510 is connected to the ECU 504 and may be connected to any other component of the vehicle. The memory 510 is configured to store any data described herein, such as the parking meter data, curb data, street sign data, parking regulation data, location data, any thresholds (e.g., time thresholds and/or distance thresholds) and any data received from the remote data server 530 via the transceiver 512.

The remote data server 530 may include a processor 534, a memory 532, and a transceiver 536. The memory 532 is configured to store parking related data, such as map data of parking spaces and any regulations or restrictions associated with the parking spaces. The transceiver 536 is configured to receive and transmit communications between the remote data server 530 and the vehicle 502. The mobile device 514 may also access the remote data server 530. The vehicle 502 may use the parking related data stored on the remote data server 530 to determine whether there are any regulations or restrictions associated with a particular parking location that the vehicle 502 is at. The vehicle 502 may also use the parking related data to search for new parking locations (e.g., new parking location 242, 342, 442). The processor 534 (and any processors described herein) may be one or more computer processors configured to execute instructions stored on the non-transitory memory 532.

The mobile device 514 (e.g., mobile device 214, 314, 414) includes a processor 524, a memory 526, a transceiver 528, and a display 522, which may all be connected to each other via a communications bus. The processor 524 may be one or more computer processors configured to execute instructions stored on the non-transitory memory 526. The memory 526 may be a non-transitory memory configured to store data. The transceiver 528 may be configured to transmit and receive data, similar to transceivers 512 and 536.

The processor of the mobile device 514 may be configured to render a graphical user interface to facilitate displaying of parking information, such as a time remaining on a parking meter or at a parking location with restrictions indicated by curb markings or street signs. The graphical user interface may also display warnings associated with the expiration or imminent expiration of time at a parking location. In some embodiments, the vehicle 502 includes a display screen for displaying the same parking data displayed by the mobile device 514.

In some embodiments, the mobile device 514 includes a location sensor and the processor 524 is configured to determine directions from the location of the mobile device 514 to the location of the vehicle 502. The directions may be displayed by the display 522 using a graphical user interface rendered by the processor 524.

The system 500 may also include a parking meter 506. The parking meter 506 includes a processor 518 connected to a transceiver 520 and a memory 516. The processor 518 (and any processors described herein) may be one or more computer processors configured to execute instructions stored on a non-transitory memory.

The memory 526 may be a non-transitory memory configured to store the parking meter data (e.g., amount of money or time left on the parking meter, a maximum parking time length, any parking restrictions associated with the parking spot of the parking meter). The transceiver 520 may be configured to transmit and receive data, similar to the transceiver 512. The transceiver 520 may communicate the parking meter data to the vehicle 502 and/or the mobile device 514. The communication of the parking meter data may be facilitated by a server, such as remote data server 530, which manages parking meters. The transceiver 520 may receive payment data from the vehicle 502 and/or the mobile device 514 and the processor 518 of the parking meter 506 may be configured to process payment using the received payment data.

While only one remote data server 530 is shown, any number of remote data servers in communication with each other may be used. Multiple remote data servers may be used to increase the memory capacity of the data being stored across the remote data servers, or to increase the computing efficiency of the remote data servers by distributing the computing load across the multiple remote data servers. Multiple remote data servers may be interconnected using any type of network, or the Internet.

As used herein, a "unit" may refer to hardware components, such as one or more computer processors, controllers, or computing devices configured to execute instructions stored in a non-transitory memory.

Figure 6:
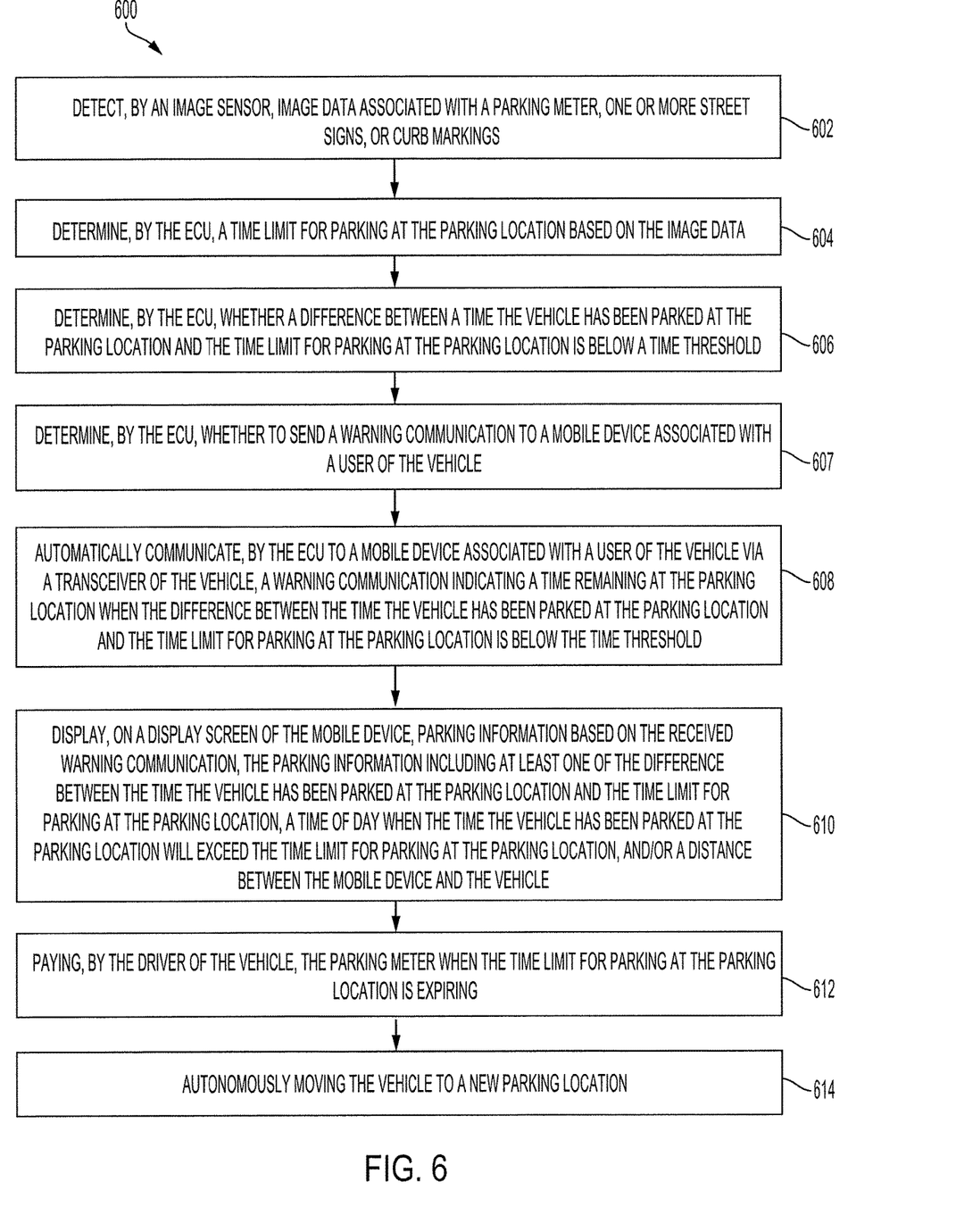
FIG. 6 illustrates a flow diagram of a process for monitoring parking, according to various embodiments of the invention.

FIG. 6 is a flow diagram of a process 600 for automatically monitoring parking status of a vehicle parked at a parking location.

An image sensor (e.g., image sensor 104) of a vehicle (e.g., vehicle 102, 502) detects image data associated with a parking meter (e.g., parking meter 106), one or more street signs (e.g., street signs 404), or curb markings (e.g., curb markings 304) (step 602). The image sensor may be a camera or any other imaging device. The ECU (e.g., ECU 504) of the vehicle may use machine learning techniques and character recognition techniques (e.g., OCR) to detect information from the image data, including a remaining time on a parking meter, one or more parking restrictions written on a parking meter or on one or more street signs, a shape of the one or more street signs, a color of one or more street signs, a color of a curb, or any writing on a curb.

The ECU determines a time limit for parking at the parking location based on the image data (step 604). The time limit may be determined based on information determined from analyzing the image data. For example, when the image data includes a reading of a display of a parking meter of a time remaining on the parking meter, the time limit may be the time remaining on the parking meter. In another example, when the image data includes writing on one or more street signs, the parking regulations of the street signs may be analyzed and based on the current time and day, the ECU may determine an amount of time that the vehicle may remain parked in the parking location. In yet another example, when the image data includes a color of the curb and/or writing on the curb, the ECU may determine an amount of time that the vehicle may remain parked in the parking location.

The ECU determines whether a difference between a time the vehicle has been parked at the parking location and the time limit for parking at the parking location is below a time threshold (step 606). For example, if the time limit for parking at the parking location is two hours and the time threshold is 30 minutes, when the vehicle has been parked at the parking location for one hour and 30 minutes, the ECU determines that the time the vehicle has been parked at the parking location and the time limit for parking at the parking location is below the time threshold.

As described herein, there may be more than one-time threshold, each configured to be set and/or adjusted by the user of the vehicle, the owner of the vehicle, the vehicle manufacturer, or any other entity with authority to change the one or more time thresholds.

The ECU determines whether to send a warning communication to a mobile device (e.g., mobile device 514) associated with the user of the vehicle (step 607). The ECU may determine to send the warning communication when the ECU determines that the time remaining at the parking location is below one or more of the time thresholds.

The ECU automatically communicates a warning communication to the mobile device associated with the user of the vehicle when the difference between the time the vehicle has been parked at the parking location and the time limit for parking at the parking location is below the time threshold (step 608). The ECU sends an instruction to a transceiver (e.g., transceiver 512) of the vehicle to communicate the warning communication to the mobile device. The mobile device may receive the warning communication using a transceiver (e.g., transceiver 528). The warning communication may include a time remaining at the parking location.

A display screen (e.g., display 522) of the mobile device displays parking information based on the received warning communication (step 610). The parking information includes at least one of the difference between the time the vehicle has been parked at the parking location and the time limit for parking at the parking location, a time of day when the time the vehicle has been parked at the parking location will exceed the time limit for parking at the parking location, and/or a distance between the mobile device and the vehicle.

When the vehicle is parked in front of a parking meter, the user may communicate an indication to the vehicle to deposit funds to the parking meter (step 612). In some embodiments, the user may communicate an indication directly to the parking meter to add funds.

As described herein, the vehicle may take further action when the time limit for parking at the parking location is being approached or when the time limit for parking at the parking location has expired. Funds may be automatically added to the parking meter by the vehicle, as described herein. The vehicle may autonomously drive to a new parking location, as described herein (step 614).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for automatically monitoring a parking meter associated with a vehicle, the system comprising:

a transceiver configured to receive location data of a mobile device associated with a user of the vehicle; and     an electronic control unit (ECU) of the vehicle configured to:

obtain parking meter data associated with the parking meter,         determine, based on the parking meter data, whether a time remaining on the parking meter is below a time threshold, and         automatically communicate, to the mobile device associated with the user via the transceiver, a warning communication indicating the time remaining on the parking meter when the time remaining on the parking meter is below the time threshold and the location data of the mobile device indicates that a location of the mobile device is more than a threshold distance away from a location of the vehicle.

2. The system of claim 1, further comprising a display screen of the mobile device configured to display parking meter information based on the received warning communication, the parking meter information including at least one of the time remaining on the parking meter, a time of day when the parking meter will expire, or a distance between the mobile device and the vehicle.

3. The system of claim 1, further comprising an image sensor configured to detect image data associated with the parking meter, and     wherein the ECU obtains the parking meter data by determining the parking meter data based on the image data detected by the image sensor.

4. The system of claim 1, wherein the transceiver is further configured to receive the parking meter data from the parking meter, and     wherein the ECU obtains the parking meter data by receiving the parking meter data from the parking meter.

5. The system of claim 1, wherein the ECU is further configured to:

determine, based on the parking meter data, whether the time remaining on the parking meter is below a baseline amount of time; and     automatically communicate, via the transceiver, a payment to the parking meter when the time remaining on the parking meter is below the baseline amount of time and the location data of the mobile device indicates that the mobile device is more than a threshold distance away from the vehicle.

6. The system of claim 1, wherein the ECU is further configured to:

determine, based on the parking meter data, whether the time remaining on the parking meter is expired;

autonomously drive the vehicle to a new parking location when the time remaining on the parking meter is expired and the location data of the mobile device indicates that the mobile device is more than a threshold distance away from the vehicle; and     automatically communicate, to the mobile device associated with the user via the transceiver, the new parking location.

7. The system of claim 6, wherein the mobile device associated with the user is configured to determine navigation directions from a current location of the mobile device to the new parking location and display the navigation directions on a display screen of the mobile device.

8. The system of claim 1, wherein the threshold distance is determined based on a comparison between an expected time for the user to traverse a distance between the location of the mobile device and the location of the vehicle and the time remaining on the parking meter.

9. A system for automatically monitoring parking status of a vehicle parked at a parking location, the system comprising:
an image sensor configured to detect image data associated with one or more street signs or curb markings; and
an electronic control unit (ECU) connected to the image sensor and configured to:
determine a time limit for parking at the parking location based on the image data,
determine whether a difference between a time the vehicle has been parked at the parking location and the time limit for parking at the parking location is below a time threshold, and
automatically communicate, to a mobile device associated with a user of the vehicle via a transceiver, a warning communication indicating a time remaining at the parking location when the difference between the time the vehicle has been parked at the parking location and the time limit for parking at the parking location is below the time threshold.

10. The system of claim 9, further comprising a display screen of the mobile device configured to display parking information based on the received warning communication, the parking information including at least one of the difference between the time the vehicle has been parked at the parking location and the time limit for parking at the parking location, a time of day when the time the vehicle has been parked at the parking location will exceed the time limit for parking at the parking location, and/or a distance between the mobile device and the vehicle.

11. The system of claim 9, wherein the ECU is further configured to analyze the image data to determine one or more parking regulations associated with the parking location, and
wherein the time limit for parking at the parking location is determined based on the one or more parking regulations.

12. The system of claim 9, further comprising a transceiver configured to receive location data associated with the mobile device associated with the user of the vehicle, and
wherein the ECU is configured to automatically communicate, to the mobile device associated with the user of the vehicle via the transceiver, the warning communication when a distance between a location of the mobile device and a location of the vehicle exceeds a distance threshold, and the difference between the time the vehicle has been parked at the parking location and the time limit for parking at the parking location is below the time threshold.

13. The system of claim 9, wherein the ECU is further configured to:
determine whether the time limit for parking at the parking location has been reached;
autonomously drive the vehicle to a new parking location when the time limit for parking at the parking location has been reached; and
automatically communicate, to the mobile device associated with the user via the transceiver, the new parking location.

14. The system of claim 13, wherein the mobile device associated with the user is configured to determine navigation directions from a current location of the mobile device to the new parking location and display the navigation directions on a display screen of the mobile device.

15. The system of claim 9, further comprising a display screen within the vehicle, and wherein the ECU is further configured to display the time limit for parking at the parking location on the display screen within the vehicle to inform the user before leaving the vehicle about the time limit for parking at the parking location.

16. A method for automatically monitoring parking status of a vehicle parked at a parking location, the method comprising:
detecting, by an image sensor, image data associated with a parking meter, one or more street signs, or curb markings;
determining, by the ECU, a time limit for parking at the parking location based on the image data;
determining, by the ECU, whether a difference between a time the vehicle has been parked at the parking location and the time limit for parking at the parking location is below a time threshold; and
automatically communicating, by the ECU to a mobile device associated with a user of the vehicle via a transceiver of the vehicle, a warning communication indicating a time remaining at the parking location when the difference between the time the vehicle has been parked at the parking location and the time limit for parking at the parking location is below the time threshold.

17. The method of claim 16, further comprising displaying, on a display screen of the mobile device, parking information based on the received warning communication, the parking information including at least one of the difference between the time the vehicle has been parked at the parking location and the time limit for parking at the parking location, a time of day when the time the vehicle has been parked at the parking location will exceed the time limit for parking at the parking location, or a distance between the mobile device and the vehicle.

18. The method of claim 16, further comprising:
determining, by the ECU, whether the time limit for parking at the parking location has been reached;
autonomously driving the vehicle, by the ECU, to a new parking location when the time limit for parking at the parking location has been reached; and
automatically communicating, to the mobile device associated with the user via the transceiver, the new parking location.

19. The method of claim 18, further comprising:
determining, by the mobile device associated with the user, navigation directions from a current location of the mobile device to the new parking location; and
displaying, by a display screen of the mobile device, the navigation directions.

20. The method of claim 16, wherein the image data is associated with the parking meter and the time limit for parking at the parking location is a time remaining on the parking meter, and wherein the method further comprises:
receiving, by the transceiver of the vehicle, location data of the mobile device;
determining, by the ECU, based on the image data, whether the time remaining on the parking meter is below a baseline amount of time; and
automatically communicating, via the transceiver of the vehicle, a payment to the parking meter when the time remaining on the parking meter is below the baseline amount of time and the location data of the mobile device indicates that the mobile device is more than a threshold distance away from the vehicle.

* * * * *